(12) United States Patent
Pitzer et al.

(10) Patent No.: US 10,069,586 B2
(45) Date of Patent: Sep. 4, 2018

(54) OPTICAL NETWORK POWER CONSUMPTION MITIGATION

(75) Inventors: Armin Pitzer, Krefeld (DE); Anthony Sanders, Haar (DE); Christian Jenkner, Klagenfurt (AT)

(73) Assignee: Lantiq Deutschland GmbH, Neubiberg (DE)

( * ) Notice: Subject to any disclaimer, the term of this patent is extended or adjusted under 35 U.S.C. 154(b) by 878 days.

(21) Appl. No.: 13/170,413

(22) Filed: Jun. 28, 2011

(65) Prior Publication Data

US 2012/0051751 A1    Mar. 1, 2012

Related U.S. Application Data

(60) Provisional application No. 61/358,996, filed on Jun. 28, 2010.

(51) Int. Cl.
*H04J 14/02* (2006.01)
*H01S 3/00* (2006.01)
*H04J 3/16* (2006.01)

(52) U.S. Cl.
CPC ................. *H04J 3/1694* (2013.01)

(58) Field of Classification Search
CPC .................................................. H04J 3/1694
USPC .............. 398/72, 75, 79, 98–100; 372/38.02, 372/38.01, 38.07, 29.02
See application file for complete search history.

(56) References Cited

U.S. PATENT DOCUMENTS

| | | | | |
|---|---|---|---|---|
| 6,778,557 B1 * | 8/2004 | Yuki | ................... | H04L 12/1877 370/230 |
| 6,859,624 B1 * | 2/2005 | Kuo | ..................... | H04B 10/508 398/164 |
| 7,012,929 B2 * | 3/2006 | Umayabashi | ......... | H04J 3/1694 370/458 |
| 7,239,622 B2 * | 7/2007 | Black | .................... | H04W 16/00 370/321 |
| 7,835,641 B2 * | 11/2010 | Renner | ................... | H04B 10/50 398/15 |
| 8,073,329 B2 * | 12/2011 | Gao | ................... | H04Q 11/0067 398/66 |
| 2002/0024971 A1 * | 2/2002 | Umayabashi | ......... | H04J 3/1694 370/468 |

(Continued)

FOREIGN PATENT DOCUMENTS

EP    446196 A2 *    9/1991
EP    2 026 508 A1    2/2009

(Continued)

OTHER PUBLICATIONS

EPO Search Report, Appl. No. 10006686.9.-1237, dated Oct. 18, 2010.

*Primary Examiner* — Amritbir Sandhu
(74) *Attorney, Agent, or Firm* — Eschweiler & Potashnik, LLC

(57) ABSTRACT

The described implementations relate a Passive Optical Network (PON). In one implementation, the PON includes an Optical Network Unit (ONU) that has at least one transmitter subsystem component and an associated optical transmitter. The at least one transmitter subsystem component may be configured to be in an enabled state during a timeslot period assigned to the ONU for transmitting an upstream data burst and a disabled state after the timeslot ends.

13 Claims, 6 Drawing Sheets

(56) References Cited

U.S. PATENT DOCUMENTS

| | | | |
|---|---|---|---|
| 2003/0007210 A1* | 1/2003 | Kenny | H04J 14/028 398/98 |
| 2003/0086383 A1* | 5/2003 | Bremer | H04B 1/109 370/311 |
| 2003/0215243 A1 | 11/2003 | Booth | |
| 2005/0041682 A1 | 2/2005 | Kramer | |
| 2007/0116466 A1* | 5/2007 | Gewirtzman | H04J 3/1694 398/71 |
| 2007/0116467 A1* | 5/2007 | Kwon | G01M 11/3136 398/72 |
| 2007/0153849 A1* | 7/2007 | Koren | H01S 5/042 372/38.02 |
| 2008/0117943 A1* | 5/2008 | Nishiyama | H01S 5/06832 372/29.02 |
| 2009/0110403 A1* | 4/2009 | Kramer | H04Q 11/0067 398/98 |
| 2009/0123151 A1 | 5/2009 | Nagel et al. | |
| 2009/0135241 A1* | 5/2009 | Miyake | B41J 2/471 347/249 |
| 2009/0226170 A1* | 9/2009 | Zou | H04J 3/1694 398/79 |
| 2009/0238226 A1* | 9/2009 | Moto | H01S 5/042 372/38.02 |
| 2009/0297162 A1* | 12/2009 | Kai | H04J 3/1694 398/135 |
| 2010/0111523 A1* | 5/2010 | Hirth | H04B 10/27 398/25 |
| 2010/0123895 A1* | 5/2010 | Reiner | G01S 7/484 356/5.01 |
| 2012/0051751 A1* | 3/2012 | Pitzer | H04J 3/1694 398/98 |
| 2012/0106976 A1* | 5/2012 | Bernard | H04J 3/0647 398/154 |
| 2014/0219660 A1* | 8/2014 | Zhu | H04J 14/0282 398/67 |
| 2015/0055956 A1* | 2/2015 | Lee | H04B 10/272 398/79 |

FOREIGN PATENT DOCUMENTS

| | | | |
|---|---|---|---|
| EP | 2058961 A1 | 5/2009 | |
| WO | 2007058708 A1 | 5/2007 | |
| WO | WO 2007058708 A1 * | 5/2007 | H04J 3/0682 |

* cited by examiner

OPTICAL NETWORK POWER CONSUMPTION MITIGATION

RELATED APPLICATIONS

This Application is a Non-Provisional Application of Provisional Application 61/358,996, which was filed on Jun. 28, 2010. Priority of the Provisional Application is hereby claimed and the entire contents of the Provisional Application are incorporated herein by reference.

BACKGROUND

Passive Optical Networks (PONs) may be used as part of the implementation of next-generation access networks. With the large bandwidth of optical fibers, PONs can accommodate broadband voice, data, and video traffic simultaneously. Moreover, PONs can be built with existing protocols, such as Ethernet and Asynchronous Transfer Mode (ATM), which facilitate interoperability between PONs and other network equipment.

Transmissions within a PON are typically performed between an Optical Line Terminal (OLT) and Optical Network Units (ONUs). The OLT generally resides in a Central Office (CO) and couples the optical access network to a backbone, which can be an external network belonging to, for example, an Internet Service Provider (ISP) or a local exchange carrier. The ONU can reside in the residence or workplace of a customer and couples to the customer's network through a Customer-Premises Equipment (CPE).

PON communications can include downstream traffic and upstream traffic. Downstream traffic refers to the direction from an OLT to one or more ONUs, and upstream traffic refers to the direction from an ONU to the OLT. In the downstream direction, data packets may be broadcast by the OLT to all ONUs and are selectively extracted by their destination ONUs. In the upstream direction, the ONUs share channel capacity and resources, because there is generally only one link coupling the passive optical coupler to the OLT.

As the popularity of PONs increases, the number of deployed ONUs will increase. As a result, the power consumption of each ONU can no longer be ignored, and adding power mitigating features to ONU designs becomes increasingly important.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

DETAILED DESCRIPTION

Figure 1:
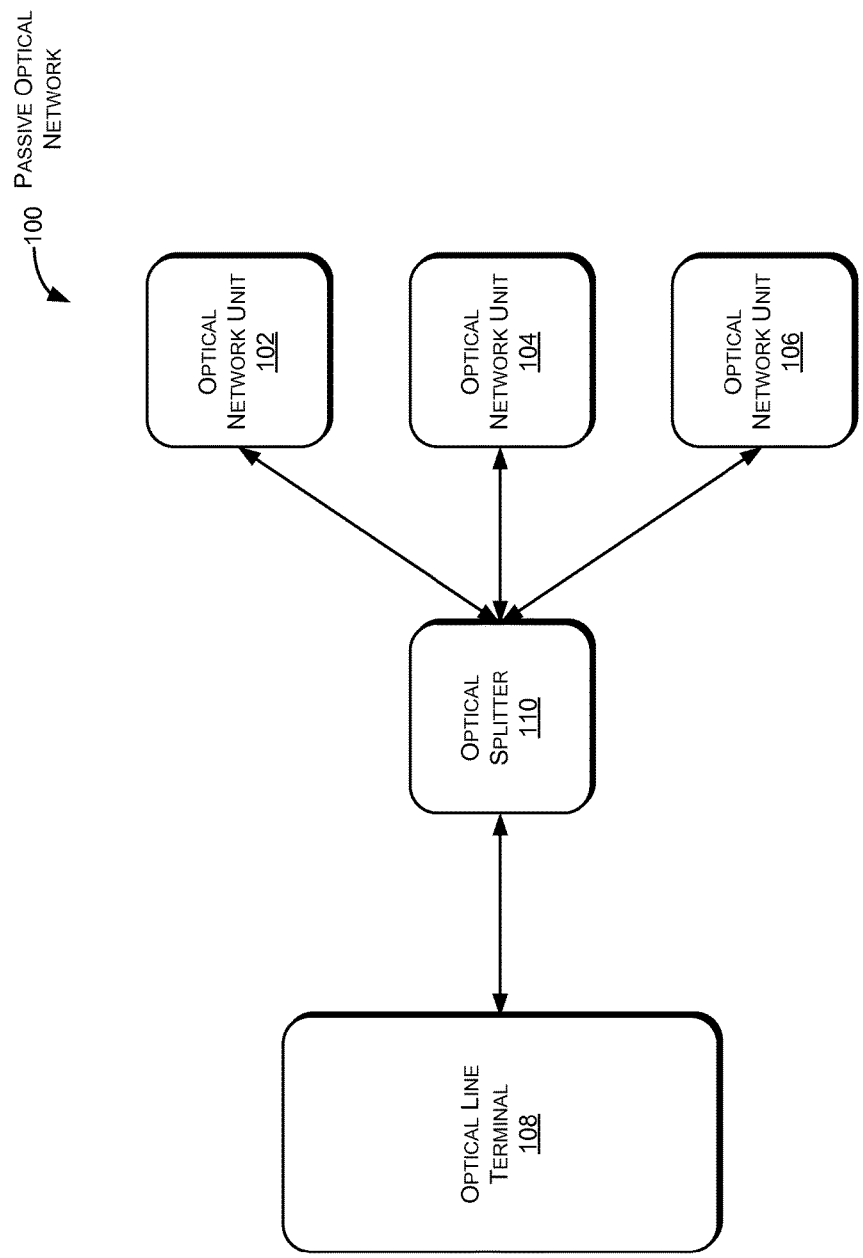
FIG. 1 illustrates an exemplary implementation of a Passive Optical Network (PON).

The following description describes implementations related to using an optical transmitter to transmit upstream data in a Passive Optical Network (PON). In various implementations, the optical transmitter may be designed to mitigate power consumption. For example, the optical transmitter may be designed to receive signals that may be used to energize or power on transmitter components downstream from the optical transmitter at some advance time before an upstream timeslot assigned thereto is to occur. Advance energizing or powering on of the transmitter components of the optical transmitter may be configurable to take into consideration various optical transmitter types, aging of components in the transmitter, temperature variations, and the like. The optical transmitter may also be designed to receive instructions that cause the optical transmitter to transmit an upstream data burst about or at the start of the upstream timeslot. Furthermore, the optical transmitter may be designed to receive instructions that cause the transmitter components to power down or enter a reduced power operating mode at the end or near the end of the upstream timeslot. Enabling the transmitter components of the optical transmitter a determined time before the beginning of an assigned timeslot duration may reduce the amount of power consumed by apparatuses and devices deployed in the PON. Similarly, disabling the transmitter subsystem and components of the optical transmitter after a timeslot ends may reduce the amount of power consumed by apparatuses and devices deployed in the PON FIG. 1 illustrates an exemplary implementation of a PON 100. The PON 100 may include Optical Network Units (ONUs) 102, 104 and 106 coupled to an Optical Line Terminal (OLT) 108 via an optical splitter 110. Traffic data transmission may be achieved, for example, by using Ethernet frames received and transmitted over two optical wavelengths, respectively, one for the downstream direction and another for the upstream direction. Downstream transmission from OLT 108 may be broadcast to all ONUs 102, 104 and 106. Each ONU 102, 104 and 106 may filter its respective data according to various known techniques. The ONUs 102, 104 and 106 may transmit respective upstream data to the OLT 108 during different timeslots allocated by the OLT 108 for each ONU 120. The splitter 110 may be used to split a single line into multiple lines.

PONs may be classified into one of the following: an ATM PON (APON), a Broadband PON (BPON), an Ethernet PON (EPON or GE-PON), and a Gigabit PON (GPON). The APON uses the ATM protocol; the BPON is designed to provide broadband services over an ATM protocol; the EPON accommodates an Ethernet protocol; and the GPON is utilized when accommodating both the ATM protocol and the Ethernet protocol. Each type of PON is a standardized technology. The PON 100 illustrated in FIG. 1 may be such a standardized PON, or a PON that has yet to be standardized by a standard determining body.

Figure 2:
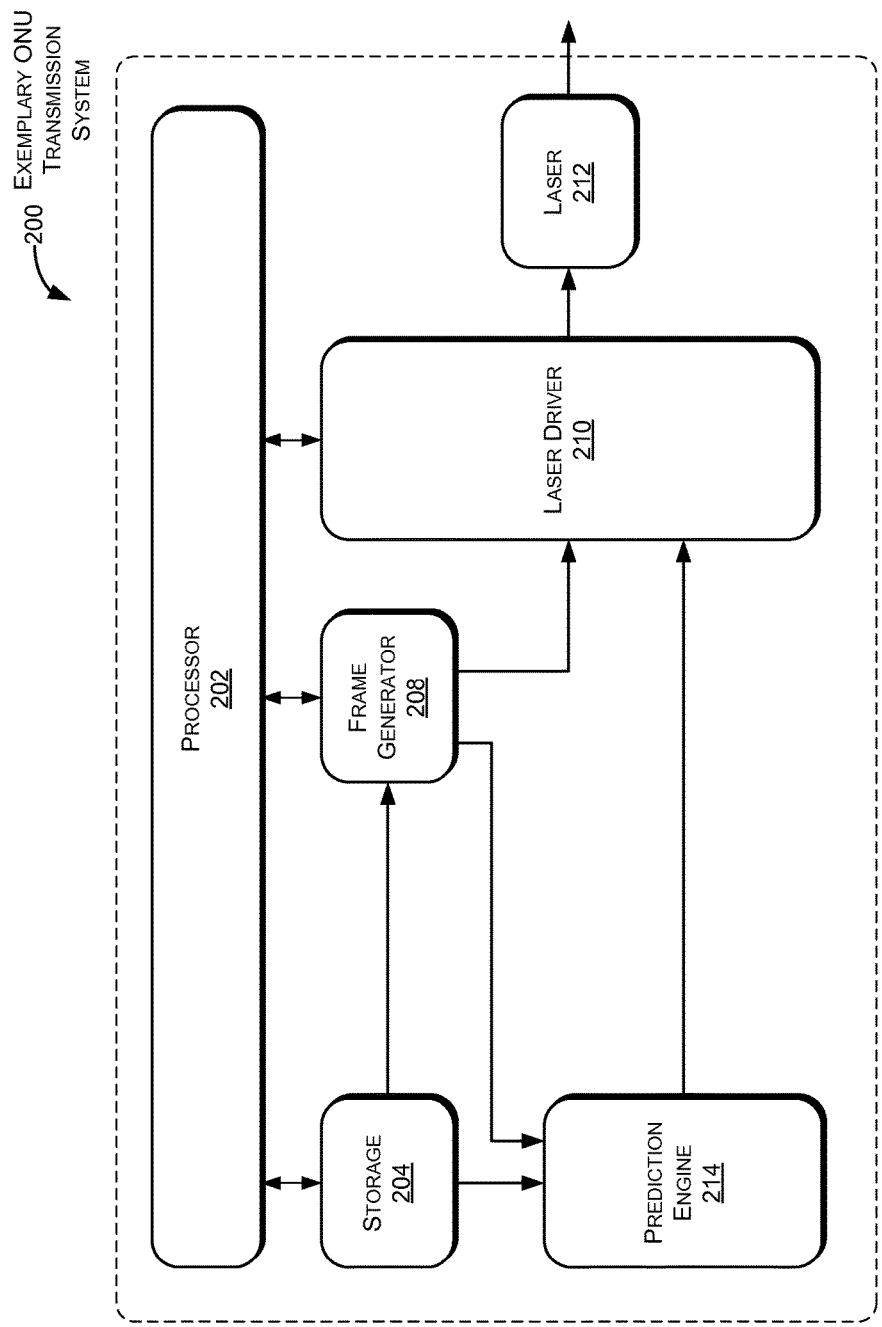
FIG. 2 illustrates an exemplary implementation of an Optical Network Unit Transmission system.

FIG. 2 illustrates an exemplary implementation of an ONU transmission system 200. The ONUs 102, 104 and 106 may be implemented to include at least the ONU transmission system 200 illustrated in FIG. 2. Some or all of the elements and modules illustrated in FIG. 2 may be integrated on one chip. Alternatively, some or all of the elements illustrated may be discrete elements associated with one or more chips.

The ONU transmission system 200 may include a processor 202. A storage 204, a frame generator 208 and a laser driver, transmit physical layer or optical driver 210 may be coupled to the processor 202. The laser driver 210 may be coupled to a laser 212. The laser driver 210 may be capable of putting the laser 212 in an active or inactive state. Furthermore, the laser driver 210 may include circuitry that may be enabled, in preparation for upstream transmission of data, some period of time before the laser 212 is activated to transmit data. Such circuitry may also be disabled after the laser 212 has completed a data burst transmission. The laser 212 may be a laser diode or other type of optical transmission apparatus.

The ONU transmission system 200 may also include a prediction engine 214. The prediction engine 214 may be coupled to the storage 204, the frame generator 208 and the laser driver 210. The prediction engine 214 may send instructions to the laser driver 210 that cause the laser driver 210 to instruct the laser 212 to transition from an inactive state to an active state, or vice versa. Furthermore, the prediction engine 214 may send instructions to the laser driver 210 to prepare or power up various circuitry of the laser driver 210 prior to activating the laser 212 to transmit data. The prediction engine 214 may also send instructions to the laser driver 210 to power down various circuitry of the laser driver 210 after deactivating the laser 212. The prediction engine 214 may also receive or access information in the storage 204 and the frame generator 208. The prediction engine 214 may use some of all of the information to derive the instructions that the engine 214 sends to the laser driver 210. The laser driver 210 may incorporate a power supply that provides voltage to the laser driver 210 and its associated circuitry. The power supply may be an integral part of the laser driver 210, or an external device. Furthermore, the prediction engine 214 may provide software enabled instructions to the laser driver 210 to enable control of the power supply. Alternatively, the prediction engine 214 may provide software enabled instructions directly to the power supply to achieve the transition from an inactive state to an active state, or vice versa.

The frame generator 208 may generate upstream data frames that are for transmission to the OLT 108. These upstream data frames may be sent to the laser driver 210, which in turn may transmit the upstream data frames to the OLT 108 via the laser 212. In one implementation, the upstream data frames are transmitted to the OLT 108 in bursts, where each upstream data frame has a burst length defined by, for example, an upstream bandwidth map.

Figure 2A:
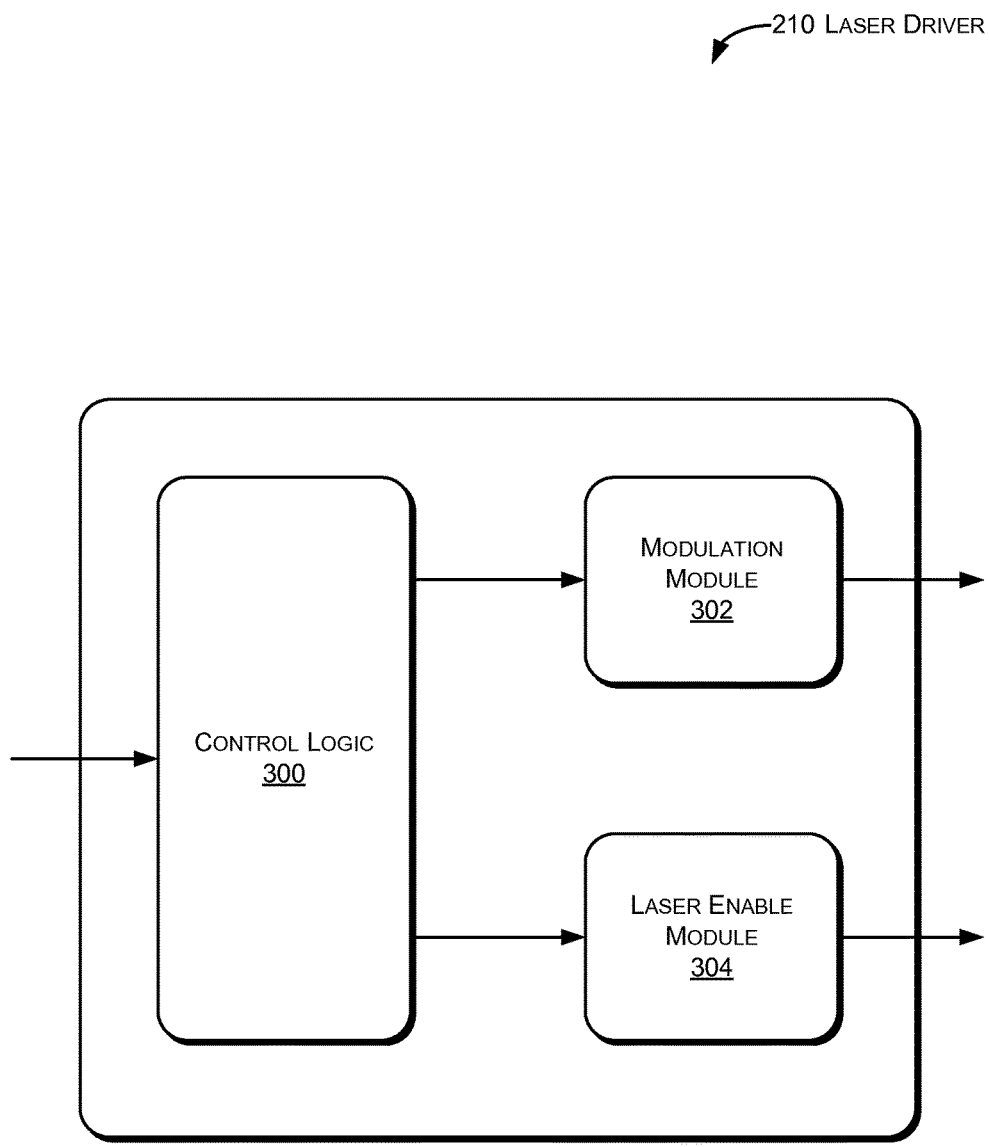
FIG. 2A illustrates a detailed view of the laser driver introduced in FIG. 2.

FIG. 2A illustrates an exemplary detailed view of the laser driver 210 introduced in FIG. 2. The laser driver 210 may include subsystem components, such as, a control logic 220, a modulation module 222 and a laser enable module 224. The control logic 220 may be coupled to the prediction engine 214. The modulation module 222 and the laser enable module 224 may each be coupled to the laser 212. Those of skill in the art understand that the subsystem components may also include clock trees, data serializers and other active components and circuit elements.

The control logic 220 may generate control and data signals that are communicated to the modulation module 222. These signals may cause the modulation module 222 to generate a modulation current that provides a burst of upstream data to the laser 212. The control logic 220 may also generate a control signal that causes the laser enable module 224 to generate a laser enable current that activates the laser 212 to produce an optical output signal to optically transmit the burst of upstream data associated with the modulation current. Signals generated by the control logic 220 may also cause the modulation module 222 and the laser enable module 224 to enter into a powered down state or a reduced power state.

The modulation module 222 may include a current source that generates the modulation current. In one implementation, the modulation current is switched through a laser diode after being generated by the current source. A current control circuit may be coupled to the current source. This current control circuit may be controlled by the control logic 220 in a stepwise manner to adjust a level of the modulation current. The laser enable module 224 may include a current source that generates the laser enable current. In one implementation, the laser enable current is switched through a laser diode after being generated by the current source. A current control circuit may be coupled to the current source of the laser enable module 224. This current control circuit may be controlled by the control logic 220 in a stepwise manner to adjust a level of the laser enable current.

Figure 3:
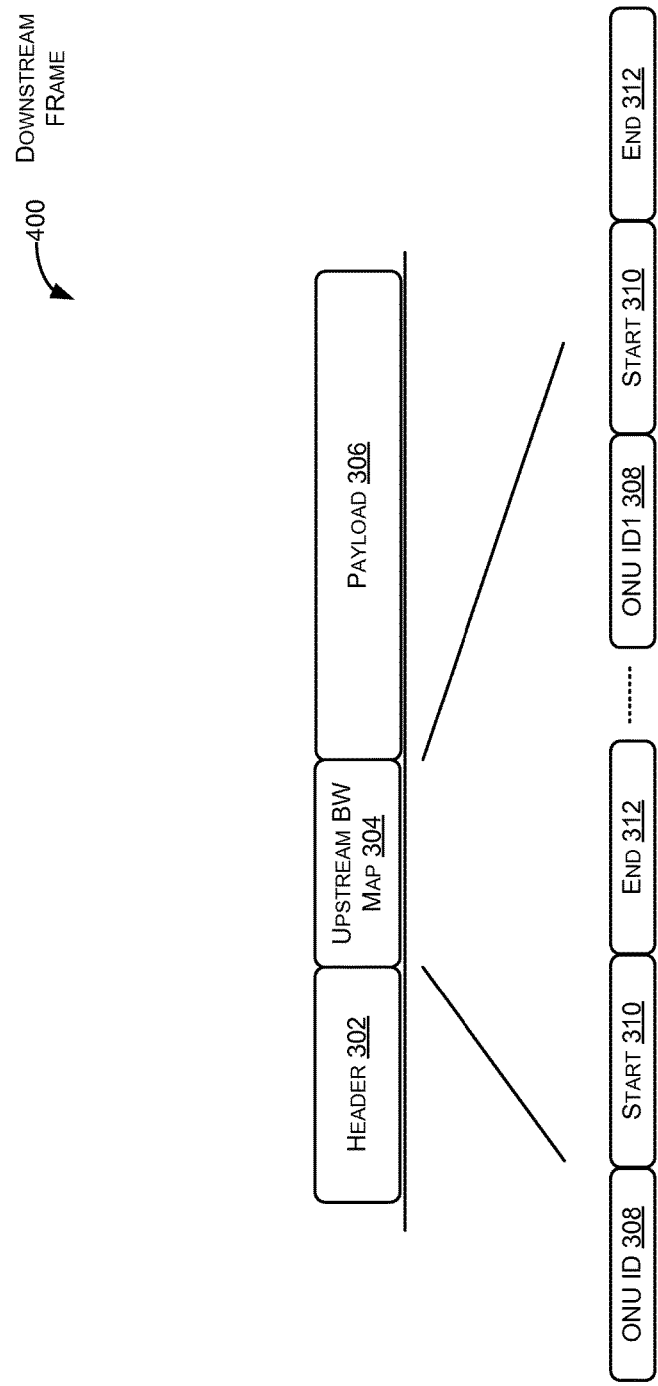
FIG. 3 illustrates an exemplary downstream frame.

FIG. 3 illustrates an exemplary downstream frame 300. The downstream frame 300 may be associated with the PON 100. The downstream frame 300 may include a header 302, an upstream bandwidth map 304 and a payload 306. The upstream bandwidth map 304 may include an ONU ID field 308, a start field 310 and an end field 312. The fields 308-312 are used to indicate a start position and an end position of each ONU upstream timeslot. Each ONU (e.g., ONUs 102-106) is to send an upstream burst packet to the OLT 108 in accordance with the timeslot information assigned thereto. For example, the upstream bandwidth map 304 may include timeslot information for the ONU 102. The start field 310 may identify that the start position of the upstream timeslot is the initial or $1^{st}$ timeslot and the end field 312 may identify that the end position of the upstream timeslot is the $100^{th}$ timeslot. Using this information, the ONU 102 is aware that it may send one or more upstream burst packets starting at the $1^{st}$ timeslot and ending at the $100^{th}$ timeslot.

The upstream bandwidth map 304 may be stored in the storage 204. However, the exemplary downstream frame 300 does not necessarily include the upstream bandwidth map 304. Rather, the downstream frame 300 may carry the ONU ID field 308, the start field 310 and the end field 312 in other portions of the frame 300 or in another packaged format other than the upstream bandwidth map 304. Furthermore, the information carried in fields 308-312 may be included in a plurality of downstream frames or other frame types.

Specifics of exemplary procedures are described below. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable storage media. The computer-readable storage media can be any available media that can be accessed by a computing device to implement the instructions stored thereon. The exemplary procedures described below may reference one or more of the exemplary devices described in FIGS. 1-3. Therefore, one or more of the devices and information illustrated in FIGS. 1-3 may used to implement the described procedures. However, the referenced devices are not limiting of the described procedures.

Figure 4:
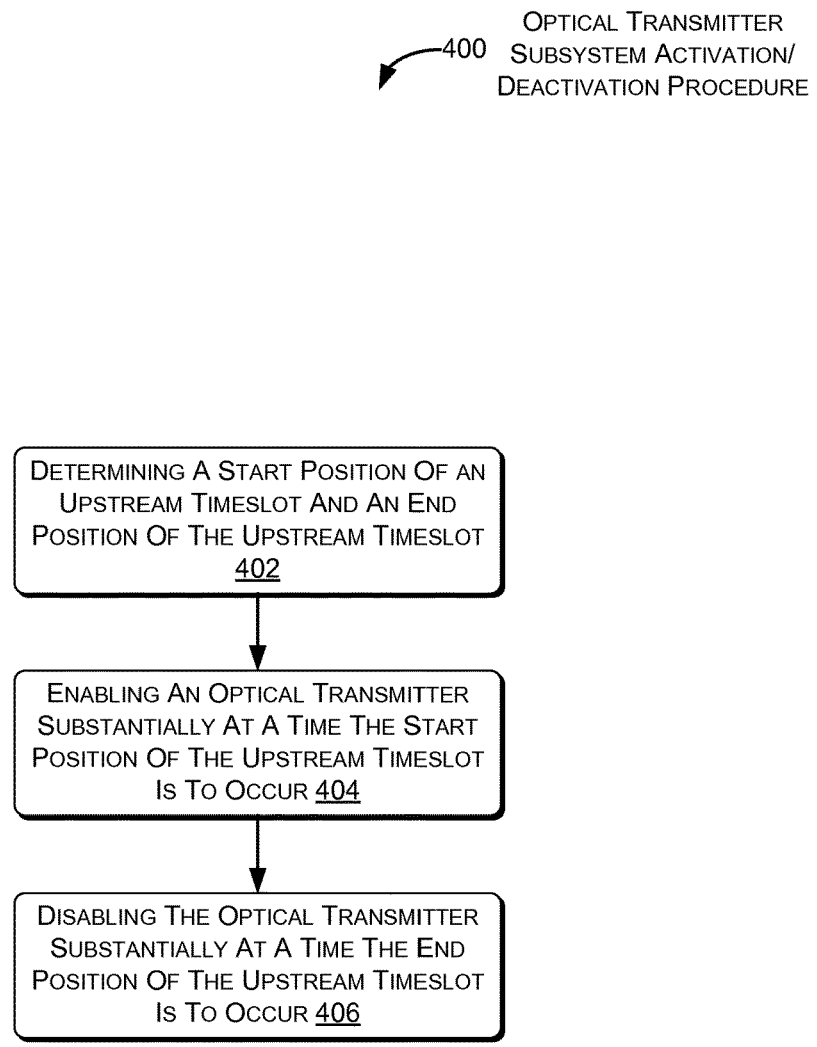
FIG. 4 illustrates an exemplary laser or optical transmitter activation and deactivation procedure.

FIG. 4 illustrates an exemplary optical transmitter subsystem activation and deactivation procedure. At block 402, a start position of an upstream timeslot and an end position of the upstream timeslot may be determined. In one exemplary embodiment, the predictive engine 214 obtains the start position and end position of the upstream timeslot from the storage 204. The predictive engine 214 may estimate or determine temporal related information that coincides with the start position and the end position of the upstream engine 214. Such temporal related information may take into consideration how long it takes the optical transmitter subsystem components (e.g., the modules 302 and 304) to power up to a ready state such that the modulation and laser enable currents may be supplied to the laser 212 in sufficient time to cause the laser 212 to transmit an upstream data burst at the start position of the upstream timeslot. In one implementation, the optical transmitter subsystem components may include some or all of the components associated with a transmit physical layer.

At block 404, an optical transmitter (e.g., the laser 212) is enabled at or about at a time the start position of the upstream timeslot is to occur. In one exemplary embodiment, the predictive engine 214 sends instructions to the laser driver 210 that may be used thereby to cause the laser 212 to transmit an upstream data burst at the start position of the upstream timeslot. These instructions may be based on information received or otherwise obtained from the storage 204. The instructions from the predictive engine 214 may also enable the laser driver 210 to disable the laser 212 at the end position of the upstream timeslot, as is indicated at block 406.

At block 404, the predictive engine 214 may also send instructions to the laser driver 210 that may be used by the control logic 220 to power on, increase supplied power to, or "wakeup" various optical transmitter subsystem components at some calculated, determined or estimated time before biasing the laser 212 to transmit an upstream data burst. Such transmitter subsystem components may include, for example, the current source associated with the modulation module 222, the current source associated with the laser enable module 224, clock trees associated with the laser driver 210, and the current control circuits in the modules 302 and 304. The calculated, determined or estimated time generated by the predictive engine 214 takes into account when the laser 212 must be enabled to transmit the upstream data burst and how long it will take the optical transmitter subsystem components to reach the necessary operational state sufficient to supply the necessary current to the laser 212. Depending on the implementation and design particulars, it may be desirable to reduce an amount of energy or power consumed by the optical transmitter subsystem components by a particular percentage, as opposed to fully or nearly fully powering down those components. In such an implementation, the calculated, determined or estimated time generated by the predictive engine 214 may be shorter as compared to a calculated, determined or estimated time required to energize or power on subsystem components that are substantially in a powered off state.

As should be readily understood from the foregoing, the predictive engine 214 may supply instructions that include distinct instruction sets. One instruction set indicates when the laser driver 210 is to cause the laser 212 to transmit an upstream data burst and when the laser 212 should be disabled. Another instruction set instructs the control logic 220 to, in anticipation of an impending upstream data burst transmission, wake, energize or other otherwise enable one or more transmitter subsystem components so that those components are ready to supply the necessary currents to the laser 212 at or around the start position of the upstream data burst. Furthermore, the another instruction set may include instructions that instruct the control logic 200 to reduce the power consumed by the subsystem components once the laser 212 completes the upstream data burst. The instructions to actually transmit an upstream data burst may originate from, for example, the frame generator 208 as opposed to the predictive engine 214.

Figure 5:
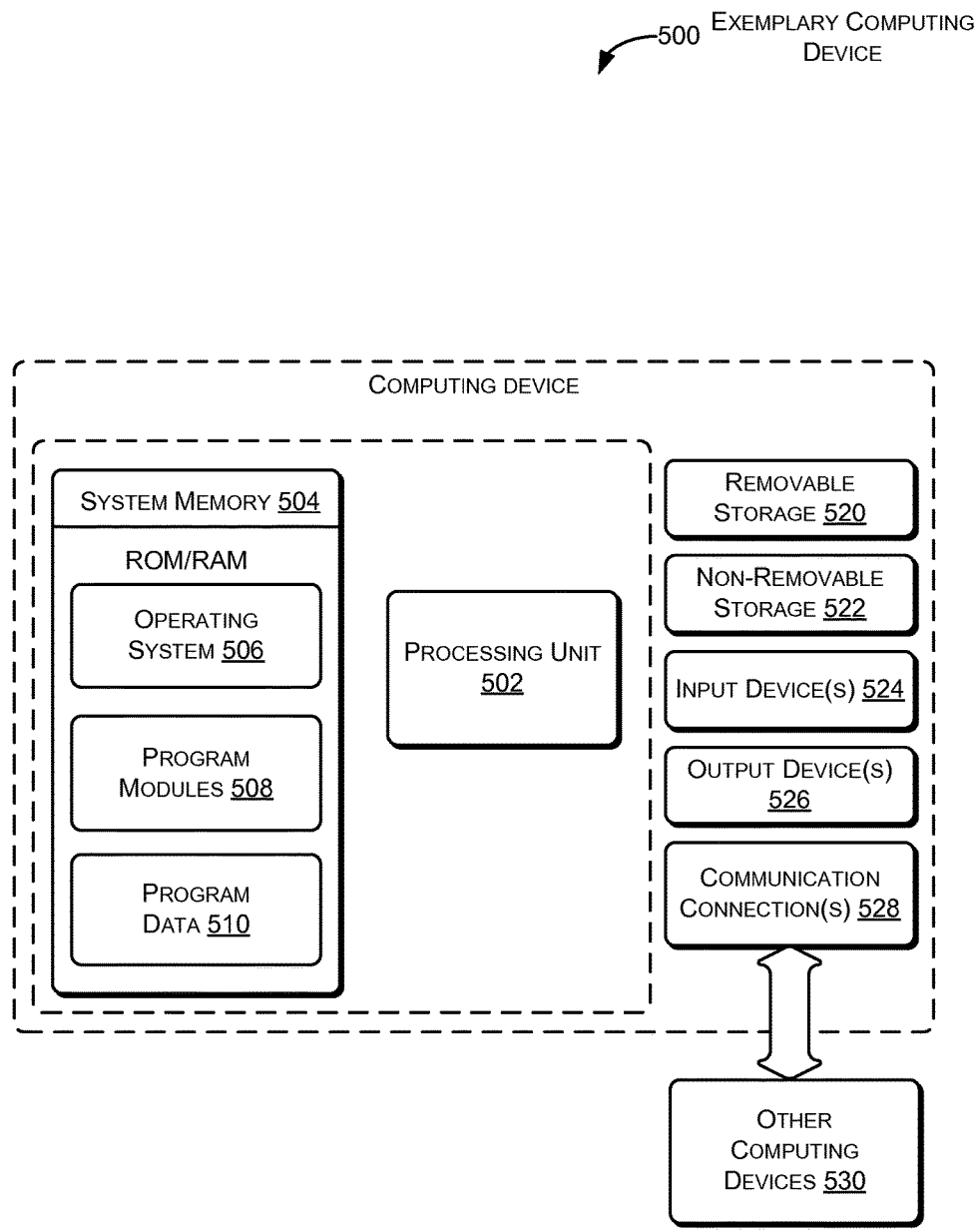
FIG. 5 is an illustrative computing device that may be used to implement the devices, modules, apparatuses, and other hardware.

FIG. 5 is an illustrative computing device that may be used to implement the devices, modules, apparatuses, processes, procedures and hardware discussed herein. In a very basic configuration, the computing device 500 includes at least one processing unit 502 and system memory 504. Depending on the exact configuration and type of computing device 500, the system memory 504 may be volatile (such as RAM), non-volatile (such as ROM and flash memory) or some combination of the two. The system memory 504 typically includes an operating system 506, one or more program modules 508, and may include program data 510.

For the present implementations, the program modules 508 may realize the various elements described as being associated with the architectures and implementations herein. Other modules and device functionalities described herein may also be part of the program modules 508. The computing device 500 may have additional features or functionality. And, the computing device 500 may also include additional data storage devices (removable and/or non-removable) such as, for example, magnetic disks, optical disks, or tape. Such additional storage is illustrated in FIG. 5 by removable storage 520 and non-removable storage 522. Computer storage media may include volatile and nonvolatile, removable and non-removable media implemented in any method or technology for storage of information, such as computer readable instructions, data structures, program modules, or other data. The system memory 506, removable storage 520 and non-removable storage 522 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of the device 500. Computing device 500 may also have input device(s) 524 such as keyboard, mouse, pen, voice input device, and touch input devices. Output device(s) 526 such as a display, speakers, and printer, may also be included. These devices are well known in the art and need not be discussed at length.

The computing device 500 may also contain a communication connection 528 that allow the device to communicate with other computing devices 530, such as over a network. The communication connection may also enable the computing device 500 to wirelessly communicate with many different types of wireless service providers and medium.

Various modules and techniques may be described herein in the general context of computer-executable instructions, such as program modules, executed by one or more computers or other devices. Generally, program modules include routines, programs, objects, components, data structures, and so forth, for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described in this disclosure and variations of these specific features and acts may be implemented separately or may be combined.

The invention claimed is:

1. A method configured to control an optical transmitter subsystem, the method comprising:
   determining a start position of an upstream timeslot for transmitting optical signals; determining a first amount of time necessary to enable one or more modulation current sources to transition from a reduced energy state to a ready state where the one or more modulation current sources are capable of providing modulation currents to the optical transmitter;
   generating a first set of instructions that instructs the one or more modulation current sources to activate at a first time corresponding to the first amount of time prior to the start position of the upstream time slot;
   providing the first set of instructions to a modulation module that includes the one or more modulation current sources;
   determining a second amount of time necessary to enable one or more laser enable current sources to transition from the reduced energy state to the ready state where the one or more laser enable current sources are capable of providing a bias current to the optical transmitter;
   generating a second set of instructions that instructs the one or more laser enable current sources to activate at a second time corresponding to the second amount of time prior to the start position of the upstream time slot; and
   providing the second set of instructions to a laser enable module that includes the one or more laser enable current sources.

2. The method according to claim 1, further comprising: generating a third set of instructions to disable the one or more modulation current sources substantially at an end position of the upstream timeslot; and
   providing the third set of instructions to the modulation module.

3. The method according to claim 1, further comprising obtaining the start position and an end position from a downstream data transmission.

4. The method according to claim 1, wherein the one or more modulation current sources are associated with laser driver used in a Passive Optical Network (PON).

5. The method according to claim 1, wherein the one or more modulation current sources are associated with an Optical Network Unit (ONU).

6. The method according to claim 1, wherein the first amount of time is different from the second amount of time.

7. The method according to claim 1, further comprising: generating a fourth set of instructions to disable the one or more laser enable current sources substantially at an end position of the upstream timeslot; and providing the fourth set of instructions to the laser enable module.

8. An apparatus, comprising:
   a storage circuit configured to store a start position of an upstream timeslot to transmit optical signals;
   a prediction engine circuit configured to:
      receive the start position stored in the storage circuit;
      determine a first amount of time necessary to enable at least one modulation current source of an optical transmitter to transition from a reduced energy state to a ready state sufficient to supply a modulation current to the optical transmitter;
      generate a first set of instructions that instructs the at least one modulation current source to activate at a first time corresponding to the first amount of time prior to the start position of the upstream time slot; and
      provide the first set of instructions to a modulation module that includes the at least one modulation current sources;
      determine a second amount of time necessary to enable one or more laser enable current sources to transition from the reduced energy state to the ready state where the one or more laser enable current sources are capable of providing a bias current to the optical transmitter;
      generate a second set of instructions that instructs the one or more laser enable current sources to activate at a second time corresponding to the second amount of time prior to the start position of the upstream time slot; and
      provide the second set of instructions to a laser enable module that includes the one or more laser enable current sources.

9. The apparatus according to claim 8, wherein the optical transmitter is configured to transmit an upstream data burst at the start position of the upstream timeslot.

10. The apparatus according to claim 8, wherein the storage circuit and the prediction engine circuit are integrated on a single chip.

11. The apparatus according to claim 8, wherein the prediction engine circuit is configured to:
    generate a third set of instructions to disable the at least one modulation current source substantially at an end position of the upstream timeslot; and
    provide the third set of instructions to the laser enable module.

12. The apparatus according to claim 8, wherein the first amount of time is different from the second amount of time.

13. The apparatus according to claim 8, wherein the prediction engine circuit is configured to:
    generate a fourth set of instructions to disable the one or more laser enable current sources substantially at an end position of the upstream timeslot; and
    provide the fourth set of instructions to the laser enable module.

* * * * *